United States Patent
Usukura et al.

(10) Patent No.: US 8,120,502 B2
(45) Date of Patent: Feb. 21, 2012

(54) SWITCH OPENING/CLOSING DETECTION APPARATUS

(75) Inventors: Yasutaka Usukura, Saitama (JP); Kenichi Machida, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 692 days.

(21) Appl. No.: 12/330,301

(22) Filed: Dec. 8, 2008

(65) Prior Publication Data

US 2009/0195398 A1    Aug. 6, 2009

(30) Foreign Application Priority Data

Jan. 31, 2008    (JP) .................................. 2008-020931

(51) Int. Cl.
*G08B 21/00*    (2006.01)

(52) U.S. Cl. ........ 340/644; 340/453; 340/438; 340/635; 327/172; 327/405; 192/84.1; 192/85.1; 192/30 R; 477/5; 477/6

(58) Field of Classification Search .................. 340/453, 340/644, 425.5, 438, 679, 680, 686.1, 687; 477/5, 6; 324/415; 303/9.62, 9.64; 903/909, 903/912; 192/84.1, 85.1, 30 R
See application file for complete search history.

(56) References Cited

U.S. PATENT DOCUMENTS

2005/0007254 A1*  1/2005  Heider et al. .................. 340/644
2008/0072587 A1*  3/2008  Sakikawa et al. ............... 60/435

FOREIGN PATENT DOCUMENTS

JP            8-2404 A     1/1996
JP      2007-290580 A     11/2007

* cited by examiner

*Primary Examiner* — George Bugg
*Assistant Examiner* — Sisay Yacob
(74) *Attorney, Agent, or Firm* — Birch, Stewart, Kolasch & Birch, LLP

(57) ABSTRACT

To detect opening/closing of a neutral detection hydraulic switch by a detection apparatus and detect breakage of a wiring line connected between the detection apparatus and the switch. Since a second contact and an ECU are connected to each other by two wiring lines, even if one of the wiring lines is broken, opening/closing of the neutral detection hydraulic switch can be detected through the remaining one of the wiring lines. Since different voltages are applied to the wiring lines through resistance type voltage dividing circuits, the occurrence of the wire breakage can be detected making use of the fact that the voltage detected by the ECU upon opening of the neutral detection hydraulic switch when one of the wiring lines is broken is different from the voltage when none of the wiring lines is broken.

20 Claims, 5 Drawing Sheets

FIG. 3

| Abnormal state | | N/D | Hydraulic pressure | SW (16) | state | Ex | Ey |
|---|---|---|---|---|---|---|---|
| Normal state | | N | Low | Open | 1 | $\dfrac{Vcc \times R1L \cdot R2L/(R1L+R2L)}{R1H \cdot R2H/(R1H+R2H)+R1L \cdot R2L/(R1L+R2L)}$ =1.71 [V] | Same as left |
| | | D | High | Closed | 2 | 0 | 0 |
| Breakage at X point | | N | Low | Open | 3 | $Vcc \times \dfrac{R1L}{R1H+R1L}$ =9 [V] | $Vcc \times \dfrac{R2L}{R2H+R2L}$ =0.92 [V] |
| | | D | High | Closed | 4 | $Vcc \times \dfrac{R1L}{R1H+R1L}$ =9 [V] | 0 |
| Short-circuiting at X point | | N | Low | Open | 5 | 0 | 0 |
| | | D | High | Closed | 6 | 0 | 0 |
| Breakage at Y point | | N | Low | Open | 7 | $Vcc \times \dfrac{R1L}{R1H+R1L}$ =9 [V] | $Vcc \times \dfrac{R2L}{R2H+R2L}$ =0.92 [V] |
| | | D | High | Closed | 8 | 0 | $Vcc \times \dfrac{R2L}{R2H+R2L}$ =0.92 [V] |
| Short-circuiting at Y point | | N | Low | Open | 9 | 0 | 0 |
| | | D | High | Closed | 10 | 0 | 0 |

SWITCH OPENING/CLOSING DETECTION APPARATUS

CROSS-REFERENCE TO RELATED APPLICATIONS

The present application claims priority under 35 USC 119 to Japanese Patent Application No. 2008-020931 filed on Jan. 31, 2008 the entire contents of which are hereby incorporated by reference.

BACKGROUND OF THE INVENTION

1. Field of the Invention

This invention relates to a switch opening/closing detection apparatus wherein opening/closing of a switch having first and second contacts is detected by a control unit connected to the switch through a wiring line. More particularly, to a switch opening/closing detection apparatus suitable to detect opening/closing of a neutral detection hydraulic switch for detecting connection/non-connection of a clutch of a motorcycle.

2. Description of Background Art

As shown in FIG. 4, a switch opening/closing detection apparatus is known in the prior art wherein, in order to detect opening/closing of a switch 2 grounded at one of contacts thereof, the other contact of the switch 2 and a pulled up port 3 of an ECU (electronic control unit) 4 are connected to each other by a wiring line (harness) 5.

When the switch 2 is closed, the potential of the port 3 becomes the low level, but when the switch 2 is opened, the potential of the port 3 becomes the high level. Therefore, opening/closing of the switch 2 can be detected by a CPU 6.

This switch opening/closing detection apparatus detects in error that, when the wiring line 5 is broken, the switch 2 is in an open state irrespective of whether the switch 2 is open or closed.

Regarding a liquid pressure switch grounded at a contact thereof and having a normally closed contact which is open when a liquid pressure is applied thereto but is closed when no liquid pressure is applied, a technique which solves the detection error described above has been proposed. See, for example, Official Gazette of Japanese Patent Laid-Open No. Hei 8-2404 (FIG. 1).

As shown in FIG. 5, one of contacts is divided into two contacts, and one of the two contacts is connected to a port 7 of an ECU 9 which has a pull-down resistor built therein through a wiring line 5 while the other of the two contacts is connected to a power supply Vcc through an alarm indicator 11.

Where such a connection scheme as described above is used, when liquid pressure is applied to the switch 2 and the switch 2 is open, if the wiring line 5 is broken, then the alarm indicator 11 is turned off, and consequently, the breakage of the wiring line 5 can be detected. In other words, failure detection of an apparatus which incorporates the switch 2 can be carried out.

It is to be noted that, as a hydraulic switch having a normally open contact which is open when no hydraulic pressure is applied, a neutral detection hydraulic switch for detecting connection/non-connection of a clutch of a motorcycle is provided on an oil passage of a clutch. See, for example, Official Gazette of Japanese Patent Laid-Open No. 2007-290580 (FIG. 12, reference numeral 107).

However, in the technique disclosed in Official Gazette of Japanese Patent Laid-Open No. Hei 8-2404 (FIG. 1) above, even if the switch 2 normally operates between open and closed states, if the wiring line 5 is broken, then the apparatus in which the switch 2 is incorporated decides a failure. Therefore, there is a problem that the apparatus in which the switch 2 is incorporated is disabled.

SUMMARY AND OBJECTS OF THE INVENTION

According to an embodiment of the present invention, it is an object to provide a switch opening/closing detection apparatus which makes it possible to use an apparatus which incorporates a switch even if a wiring line which connects the switch and a control unit is broken and besides makes it possible to detect breakage of the wiring line.

According to an embodiment of the present invention, there is provided a switch opening/closing detection apparatus which includes a switch having first and second contacts grounded at the first contact thereof, a control unit for detecting opening/closing of the switch, and a wiring line connected at one end thereof to the second contact of the switch and connected at the other end thereof to the control unit, wherein the wiring line between the second contact and the control unit includes two wiring lines and voltages different from each other are applied to the wiring lines through respective resistors while the wiring lines are connected at one end thereof to different ports of the control unit and connected at the other end thereof to the second contact.

According to an embodiment of the present invention, since the wiring line between the control unit and the switch includes two wiring lines, even if one of the wiring lines is broken, opening/closing of the switch can be detected through the remaining one of the wiring lines by the control unit. Thus, it is possible to continue to use the apparatus in which the switch is incorporated. Since different voltages are applied to the wiring lines through the respective registers, the breakage of one of the wiring lines can be detected by making use of the fact that, when one of the wiring lines is broken, the voltage detected by the control unit upon opening of the switch is different from the voltage when none of the wiring lines is broken.

It is to be noted that, when the voltages applied to the wiring lines through the respective resistors are applied through individual resistance type voltage dividing circuits, there is no necessity to use different voltage generating sources.

The present invention is particularly suitable where the switch is applied to a neutral detection hydraulic switch for detecting connection/non-connection of a clutch.

According to an embodiment of the present invention, since the wiring line between the control unit and the switch includes two wiring lines, even if one of the wiring lines is broken, opening/closing of the switch can be detected through the remaining one of the wiring lines by the control unit. Thus, it is possible to continue to use the apparatus in which the switch is incorporated. Since different voltages are applied to the wiring lines through the respective registers, the breakage of one of the wiring likes can be detected by making use of the fact that, when one of the wiring lines is broken, the voltage detected by the control unit upon opening of the switch is different from the voltage when none of the wiring lines is broken.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 3 is an explanatory view of a state reference table stored in a CPU;

DETAILED DESCRIPTION OF THE PREFERRED EMBODIMENTS

In the following, an embodiment of the present invention is described with reference to the drawings.

Figure 1:
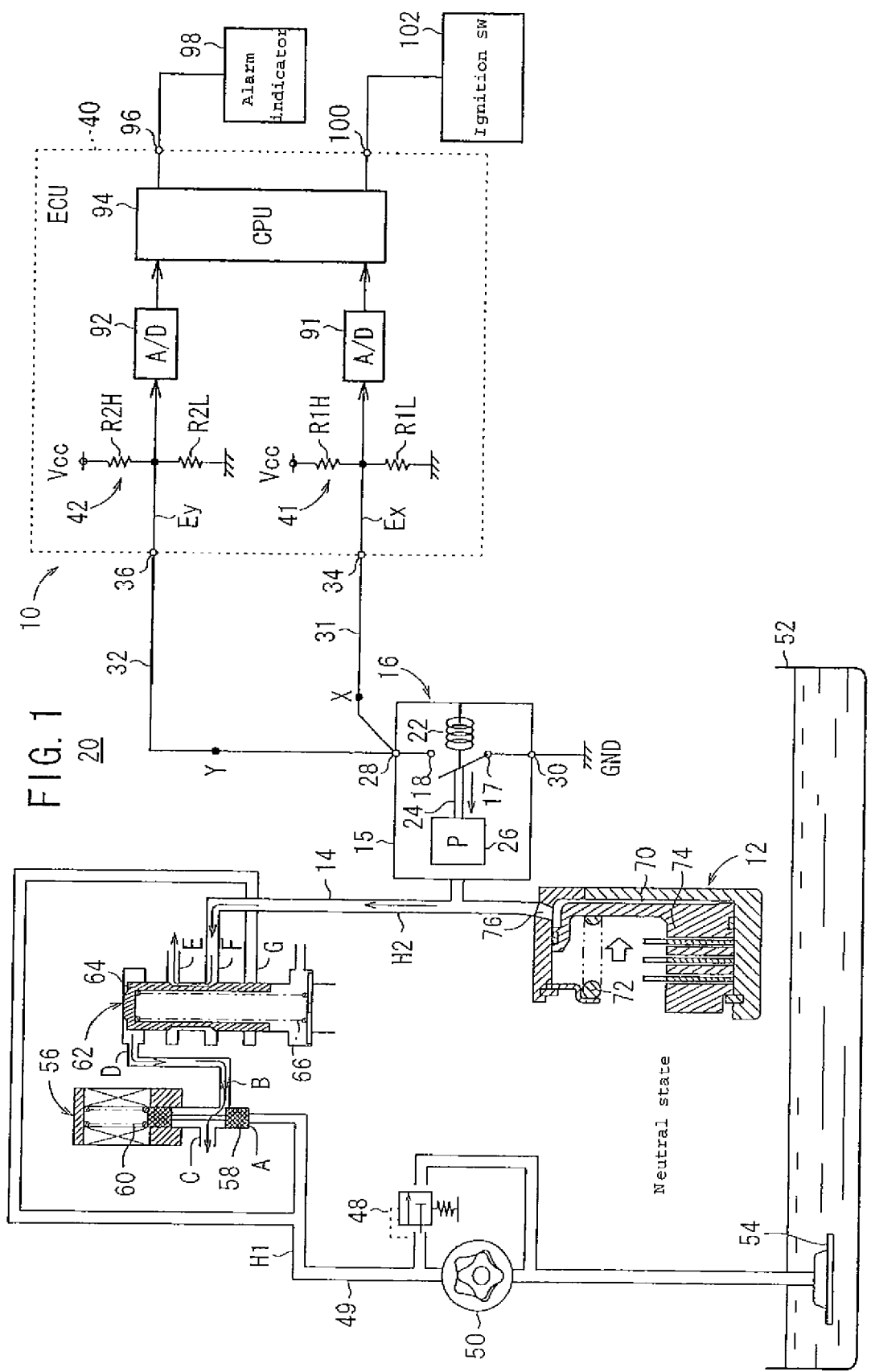
FIG. 1 is a schematic block diagram of a clutch connection-non-connection hydraulic system for a motorcycle in which a switch opening/closing detection apparatus according to an embodiment of the present invention is incorporated.

FIG. 1 shows a view of a general configuration of a clutch connection-non-connection hydraulic system 20 for a motorcycle in which a switching opening/closing detection apparatus 10 according to an embodiment of the present invention is incorporated.

FIG. 1 illustrates a neutral state which is a non-connection state of a neutral drive changeover clutch (hereinafter referred to as ND changeover clutch) 12. In the following description, the neutral drive is referred to simply as "ND."

In the neutral state of the ND changeover clutch 12, oil reserved in an oil pan 52 is pumped up through an oil strainer 54 by a high pressure oil pump 50. It is to be noted that an oil passage having a relief valve 48 is provided in parallel to the high pressure oil pump 50. The relief valve 48 is set so that the pressure of oil discharged from a high pressure oil discharge port 49 is fixed.

The transition from a connection state (driving state) of the ND changeover clutch 12 to a non-connection state (neutral state) will be described first.

By an operation from the drive to the neutral of a change by a vehicle driver, energization of a solenoid of a neutral drive changeover solenoid (hereinafter referred to as ND changeover solenoid) 56 is interrupted. Consequently, the magnetic force for pulling a valve body 58 disappears, and the valve body 58 is pushed by a coil spring 60 to close up a port A and open ports B and C.

Consequently, the oil at the top portion of a ND changeover spool valve 62 flows out into a crankcase through a port D of the ND changeover spool valve 62 and the ports B and C of the ND changeover solenoid 56 and returns to the oil pan 52.

Since the pressure to the top portion of the ND changeover spool valve 62 disappears in this manner, a valve body 64 is urged to move by a coil spring 66 to close a port G and open ports E and F.

Consequently, oil in a hydraulic chamber 70 of the ND changeover clutch 12 is pushed by a piston 74 urged by a return spring 72 to trace an oil gateway 76 and an oil passage H2 reversely and flows out into the crankcase through the ports F and E of the ND changeover spool valve 62 to return to the oil pan 52.

In this way, a clutch disk and a friction disk of the ND changeover clutch 12 are spaced away from each other to place the ND changeover clutch 12 into a non-connection state thereby to establish a neutral state.

The foregoing description is a description of the transition from the driving state to the neutral state of the ND changeover clutch 12.

A neutral detection hydraulic switch 16 is provided midway of the oil passage H2 which communicates with the hydraulic chamber 70 of the ND changeover clutch 12.

The neutral detection hydraulic switch 16 includes, in a casing 15, a second contact 18 on the stationary side, a first contact 17 on the movable side, a coil spring 22 and a pressure detection section 26 having a rod 24 which is moved back and forth by a diaphragm. The neutral detection hydraulic switch 16 further includes, on an outer periphery of the casing 15, a terminal 28 connected to the second contact 18 and another terminal 30 connected to the first contact 17.

The casing 15 is a switch having a normally open contact whose second contact 18 and first contact 17 are placed into a disconnected state when the rod 24 is pushed by the coil spring 22 to return to the pressure detection section 26 while the oil of the oil passage H2 is in an low pressure state (while the ND changeover clutch 12 is in the neutral state) as shown in FIG. 1.

When the oil in the oil passage H2 is in a high pressure state (when the ND changeover clutch 12 is in the driving state), the rod 24 is projected from the pressure detection section 26 by the pressure to connect the first contact 17 and the second contact 18 to each other to establish a closed state.

A transition of the ND changeover clutch 12 from the non-connection state (neutral state) to the connection state (driving state) will be described with reference to FIG. 2.

The solenoid of the ND changeover solenoid 56 is energized by an operation of the change from the neutral to the drive by the vehicle driver.

Figure 2:
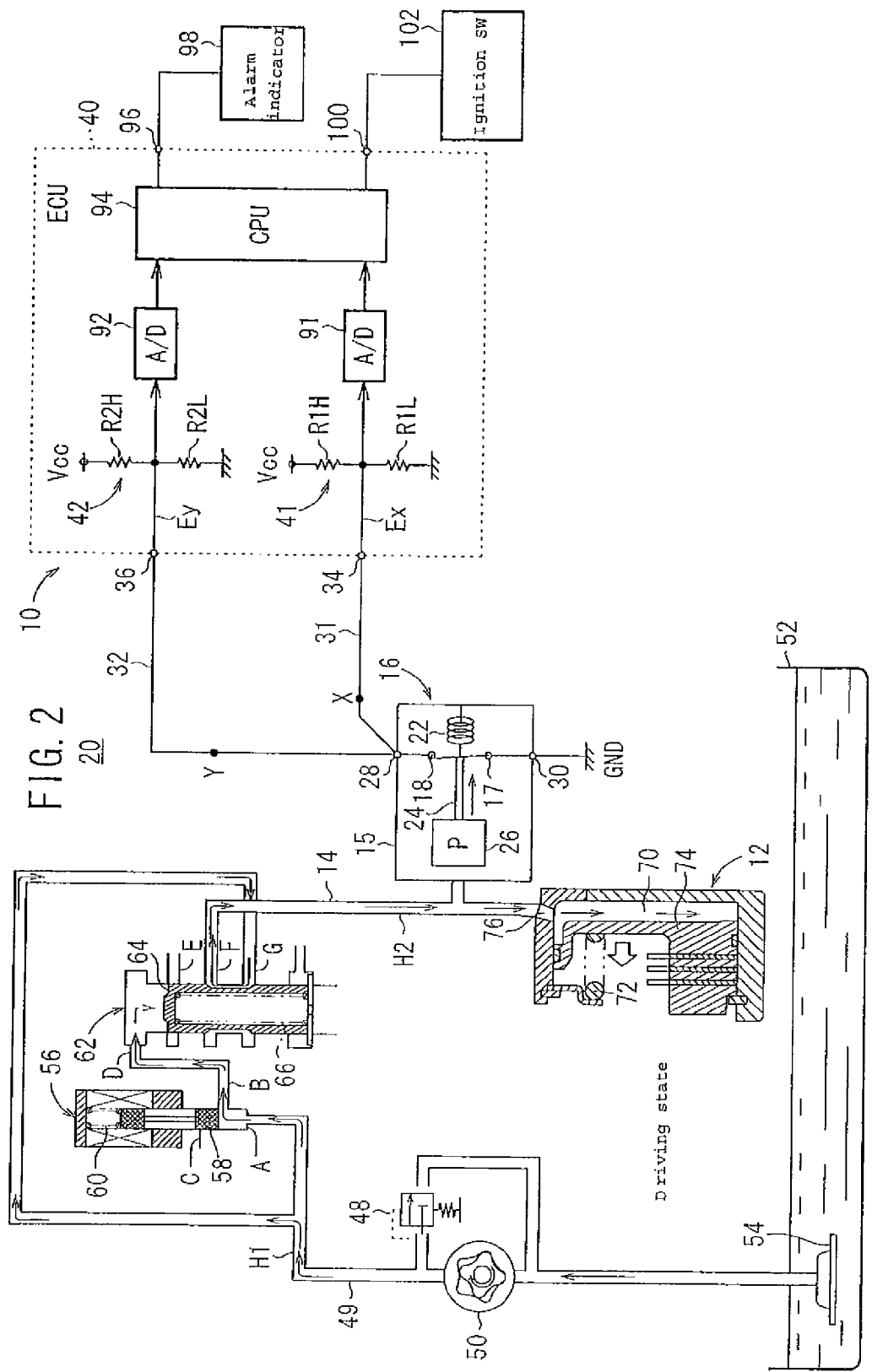
FIG. 2 is a view illustrating a transition state from a non-connection state (neutral state) to a connection state (driving state) of a neutral drive changeover switch.
Figure 4:
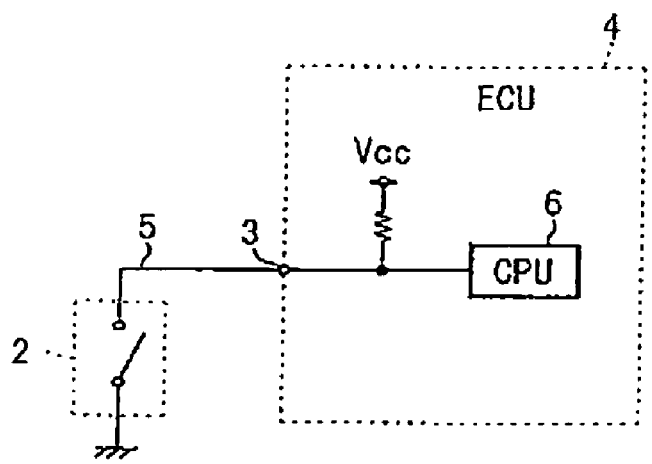
FIG. 4 is an explanatory view of a wire breakage detection device according to an existing art.
Figure 5:
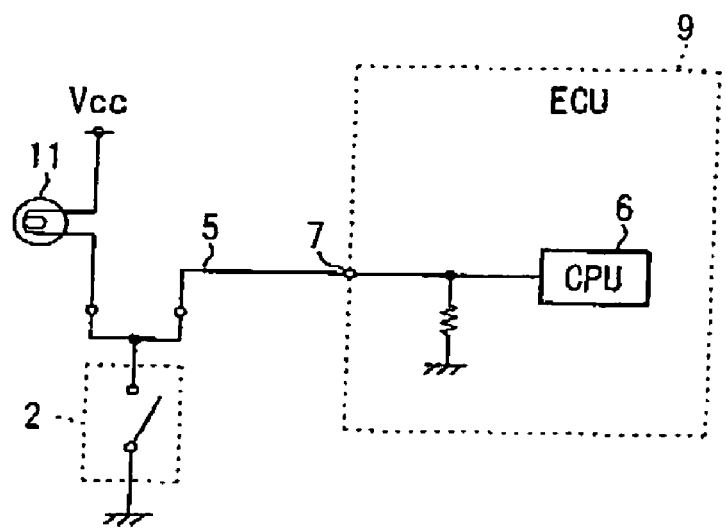
FIG. 5 is an explanatory view of a wire breakage detection device according to another existing art.

In FIG. 2, the oil is pumped up from the oil pan 52 through the oil strainer 54 by the high pressure oil pump 50. The oil discharged from the high pressure oil discharge port 49 is discharged under a fixed pressure by an action of the relief valve 48.

The oil discharged from the high pressure oil discharge port 49 is sent from an oil passage H1 to the ND changeover solenoid 56 and the ND changeover spool valve 62.

Since the ND changeover solenoid 56 is energized when it is operated into a driving state, the valve body 58 is pulled by the solenoid against the biasing force of the coil spring 60 to open the ports A and B.

At this time, the oil goes out from the ports A and B and enters the top portion of the valve body 64 of the ND changeover spool valve 62 through the port D of the ND changeover spool valve 62 to push down the valve body 64 against the biasing force of the coil spring 66 to open the ports F and G.

The oil fed directly to the ND changeover spool valve 62 enters the ND changeover spool valve 62 through the port G and goes out from the port F through a small diameter portion of the valve body 64, and then enters the hydraulic chamber 70 of the ND changeover clutch 12 through the oil passage H2 and the oil gateway 76 to raise the pressure in the hydraulic chamber 70 to push the piston 74 against the biasing force of the return spring 72 thereby to connect the clutch disk and the friction disk of the ND changeover clutch 12 to establish a driving state.

At this time, since the pressure of the hydraulic chamber 70 is high, that is, since the oil in the oil passage H2 is in a high pressure state, the rod 24 of the neutral detection hydraulic switch 16 is projected from the pressure detection section 26 by the pressure of the oil to connect the first contact 17 and the second contact 18 to each other to place the neutral detection hydraulic switch 16 into a closed state.

The foregoing description is description regarding the transition from the neutral state to the driving state of the ND changeover clutch 12.

Referring to FIGS. 1 and 2, the terminal 30 connected to the first contact 17 of the neutral detection hydraulic switch 16 provided on the oil passage H2 is grounded (GND) on the engine side. Two wiring lines 31 and 32 are attached at one end thereof to the terminal 28 connected to the second contact 18 by connecting metal members.

The wiring lines 31 and 32 are attached at the other end thereof to input ports 34 and 36 of an ECU (electronic control unit) by means of connecting metal members.

To the input port 34, a first resistance type voltage dividing circuit 41 formed from a resistor (pull-up resistor) R1H and another resistor (pull-down resistor) R1L for dividing the power supply Vcc are connected, and the input side of an A/D converter 91 for measuring a voltage Ex appearing at the input port 34, are connected, and the voltage Ex AD converted by the A/D converter 91 is fetched into a CPU 94.

To the input port 36, a second resistance type voltage dividing circuit 42 formed from a resistor (pull-up resistor) R2H and another resistor (pull-down resistor) R2L for dividing the power supply Vcc are connected, and the input side of an A/D converter 92 for measuring a voltage Ey appearing at the input port 36, and the voltage Ey AD converted by the A/D converter 92 is fetched into the CPU 94.

In the present embodiment, the resistance value of the resistor R1H is set to R1H=6 [kΩ], the resistance value of the resistor R1L is set to R1L=2 [kΩ], the resistance value of the resistor R2H is set to R2H=12 [kΩ], and the resistance value of the resistor R2L is set to R2L=1 [kΩ].

The CPU 94 is connected to an alarm indicator 98 through a port 96 and connected to an ignition switch 102 through a port 100.

The CPU 94 of the ECU 40 implements various functions by executing a program stored in a memory such as a ROM in response to various inputs.

FIG. 3 is a reference table (reference table) 104 which illustrates calculation expressions of the voltage Ex appearing at the port 34, calculation expressions of the voltage Ey appearing at the input port 36 and particular values in a corresponding relationship to various states 1 to 10 in a normal state wherein the wiring line 31 and the wiring line 32 do not suffer from breakage nor from GND short-circuiting (short-circuiting of the wiring line 31 and (or) the wiring line 32 to the GND) and in an abnormal state wherein the wiring line 31 and the wiring line 32 suffer from breakage and (or) from GND short-circuiting. This reference table 104 is stored in the ROM in the CPU 94 in advance.

The values stored in the reference table 104 are values within a range determined by taking the dispersion of the power supply Vcc, the error of the resistors R1H, R1L, R2H and R2L and the resolution of the A/D converter 92 into consideration.

Now, (a) a wire breakage detection operation of the wiring line 31 and the wiring line 32 and (b) a GND short-circuiting detection operation of the wiring line 31 and the wiring line 32 by the CPU 94 of the switching opening/closing detection apparatus 10 will be described.

Breakage Detection Operation of the Wiring Line 31 and the Wiring Line 32

In the state 1 when, in the normal state wherein the wiring line 31 and the wiring line 32 suffer from none of wire breakage and GND short-circuiting, the ND changeover clutch 12 is in the neutral state and the neutral detection hydraulic switch 16 is in the open state (FIG. 1), the voltage Ex and the voltage Ey are equal to each other and have a value in the proximity of 1.71 [V] which is a value calculated by the following expression (1):

$$\{Vcc \times R1L \cdot R2L/(R1L+R2L)\}/[\{R1H \cdot R2H/(R1H+R2H)\}+\{R1L \cdot R2L/(R1L+R2L)\}] \quad (1)$$

Further, in the state 2 when the ND changeover clutch 12 is in the driving state and the neutral detection hydraulic switch 16 is in the closed state (FIG. 2), Ex=Ey=0 [V].

Then, where the wiring line 31 is broken at a point X, by measuring two voltages Ex and two voltages Ey exhibited by the state 3 (neutral state) and the state 4 (driving state), the wire breakage at the point X can be decided.

In particular, two voltages Ex of Ex=Vcc×R1L/(R1H+R1L)=9 [V] and two voltages Ey of Ey=Vcc×R2L/(R2H+R2L)=0.92 [V] and 0 [V] are measured.

Similarly, where the wiring line 32 is broken at another point Y, by measuring four voltages Ex and Ey exhibited by the state 7 (neutral state) and the state 8 (driving state), the wire breakage at the Y point can be determined.

In particular, two voltages Ex of Ex=Vcc×R1L/(R1H+R1L)=9 [V] and 0 [V] and two voltages Ey of Ey=Vcc×R2L/(R2H+R2L) 0.92 [V] are measured.

In this manner, where wire breakage occurs with one of the wiring lines 31 and 32, different voltages can be detected by the A/D converters 91 and 92 and a failure can be detected. Therefore, a notification of the wire breakage can be issued from the alarm indicator 98.

(B) GNG Short-Circuiting Detection Operation of the Wiring Line 31 and the Wiring Line 32

On the other hand, where short-circuiting to the GND occurs at one of the wiring line 31 and the wiring line 32, since the closed state of the neutral detection hydraulic switch 16 (the ND changeover clutch 12 is in the driving state) is the same, a normality and abnormality cannot be distinguished from each other.

Therefore, in this case, since, in an initial state immediately after the ignition switch 102 is turned ON, the oil in the hydraulic chamber 70 of the ND changeover clutch 12 has no pressure, the ND changeover clutch 12 assumes the neutral state, and therefore, it is known that the neutral detection hydraulic switch 16 is in the open state. Therefore, if both of the voltages Ex and Ey (initial diagnosis voltages) detected by the A/D converters 91 and 92 in the initial state immediately after the ignition switch 102 is turned ON are 0 [V], then a notification that a failure that the wiring line 31 or the wiring line 32 on the terminal 28 side on the second contact 18 side of the neutral detection hydraulic switch 16 is short-circuited to the GND occurs is issued from the alarm indicator 98.

In a normal case wherein no failure occurs upon initial diagnosis, if, upon later diagnosis, both of the voltages Ex and Ey are 0 [V], then it is determined that the ND changeover clutch 12 is in the driving state.

If, in the driving state, short-circuiting to the GND occurs at one of the wiring line 31 and the wiring line 32, then since the voltages Ex do not exhibit a variation from 0 [V], although a failure decision cannot be made, there is no problem even if the control is continued as it is. The control here refers to the control of, for example, making the setting of the target speed of rotation with respect to a variation of the accelerator opening by an operation of a throttle grip different between the neutral state and the driving state.

Meanwhile, in a normal state wherein no failure occurs upon initial diagnosis, if, upon later diagnosis, short-circuiting of the wiring lines 31 and 32 to the GND occurs in the neutral state, then a failure decision can be made by confirming incoincidence between the output logic of the ND changeover solenoid 56 and the input logic of the neutral detection hydraulic switch 16.

In particular, although, in the neutral state, the solenoid of the ND changeover solenoid 56 is not energized, upon this no-energization (state of FIG. 1), if the voltages Ex exhibit 0 [V] which represents the driving state, then it can be determined that the logics do not coincide with each other and a failure that short-circuiting of the wiring lines 31 and 32 to the GND occurs can be detected.

As described above, according to the embodiment described above, the switch opening/closing detection apparatus includes a neutral detection hydraulic switch 16 having a first contact 17 and a second contact 18 and grounded at the first contact 17 thereof, an ECU 40 for detecting opening/closing of the neutral detection hydraulic switch 16, and two wiring lines 31 and 32 connected commonly to a terminal 28 connected to the second contact 18 of the neutral detection hydraulic switch 16 and connected at the other terminal thereof to different input ports 34 and 36 of the ECU 40.

In this instance, a voltage {Vcc×R2L/(R2H+R2L)} is applied to a port 36 of the ECU 40 through a resistor (R2H× R2L)/(R2H+R2L), and a different voltage {Vcc×R1L/(R1H+ R1L)} is applied to another port 34 of the ECU 40 through another resistor (R1H×R1L)/(R1H+R1L).

Since the ECU 40 and the neutral detection hydraulic switch 16 are connected to each other by the two wiring lines 31 and 32 in this manner, even if one of the wiring lines 31 and 32 is broken, the opening/closing of the neutral detection hydraulic switch 16 can be detected by the ECU 40 through the remaining one of the wiring lines 31 and 32. Even if one of the wiring lines 31 and 32 is broken, driving of the motorcycle in which the switching opening/closing detection apparatus 10 according to the present embodiment is incorporated can be continued, the reliability is improved.

Further, since different voltages are applied to the wiring lines 31 and 32 through the resistors, the breakage of one of the wiring lines can be detected by making use of the fact that, when one of the wiring lines is broken, the voltage detected by the ECU 40 upon opening of the neutral detection hydraulic switch 16 is different from the potential when none of the wiring lines 31 and 32 is broken (making use of the states 3, 4, 7 and 8).

It is to be noted that, in this embodiment, since different voltages are applied through the resistance type voltage dividing circuits 41 and 42, there is no necessity to use a voltage generating source which generates different voltages.

Further, this invention is not limited to the embodiment described above, but various configurations such as use of a four-wheeled automobile can be adopted naturally based on the disclosed contents of this specification.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A switch opening/closing detection apparatus comprising:

a switch having first and second contacts and grounded at the first contact;

a control unit configured to detect opening/closing of said switch; and a wiring line connected at one end to the second contact of said switch and connected at the other end to said control unit, wherein said wiring line between said second contact and said control unit includes two wiring lines and voltages different from each other are applied to said wiring lines through respective resistors while said wiring lines are connected at one end to different ports of said control unit and connected at the other end to said second contact.

2. The switch opening/closing detection apparatus according to claim 1, wherein the voltages applied to said wiring lines through said respective resistors are applied through individual resistance type voltage dividing circuits.

3. The switch opening/closing detection apparatus according to claim 1, wherein said switch is a neutral detection hydraulic switch configured to detect connection/non-connection of a clutch.

4. The switch opening/closing detection apparatus according to claim 2, wherein said switch is a neutral detection hydraulic switch configured to detect connection/non-connection of a clutch.

5. The switch opening/closing detection apparatus according to claim 3, wherein the switch is placed into a disconnected state when low pressure is applied to the neutral detection hydraulic switch.

6. The switch opening/closing detection apparatus according to claim 3, wherein the switch is placed into a connected state when high pressure is applied to the neutral detection hydraulic switch.

7. The switch opening/closing detection apparatus according to claim 1, wherein a first wiring line is operatively connected to a first resistance type voltage dividing circuit formed from a pull-up resistor and a pull-down resistor for dividing the power supply and an A/D converter for measuring a voltage from an input port with the voltage being converted by the A/D converter and supplied to a central processing unit.

8. The switch opening/closing detection apparatus according to claim 1, wherein a second wiring line is operatively connected to a second resistance type voltage dividing circuit formed from a pull-up resistor and a pull-down resistor for dividing the power supply and an A/D converter for measuring a voltage from an input port with the voltage being converted by the A/D converter and supplied to a central processing unit.

9. The switch opening/closing detection apparatus according to claim 1, wherein an opening and closing of a neutral detection hydraulic switch occurs even if one of the two wiring lines is broken.

10. The switch opening/closing detection apparatus according to claim 1, wherein different voltages are applied through resistance type voltage dividing circuits which alleviates the need for a voltage generating source for generating different voltages.

11. A switch opening/closing detection apparatus comprising:

a switch having first and second contacts wherein the first contact is grounded;

a control unit configured to detect opening/closing of said switch; and a first wiring line connected at one end to the second contact of said switch and connected at the other end to said control unit;

a second wiring line connected at one end to the second contact of said switch and connected at the other end to said control unit;

a first predetermined voltage being applied to the first wiring line;

a second predetermined voltage being applied to the second wiring line;

said first predetermined voltage and said second predetermined voltage being different from each other with the distinct voltages being applied to the first and second wiring lines through respective resistors while said wiring lines are connected at one end to different ports of said control unit and connected at the other end to said second contact.

12. The switch opening/closing detection apparatus according to claim 11, wherein the voltages applied to said first and second wiring lines through said respective resistors are applied through individual resistance type voltage dividing circuits.

13. The switch opening/closing detection apparatus according to claim 11, wherein said switch is a neutral detection hydraulic switch configured to detect connection/nonconnection of a clutch.

14. The switch opening/closing detection apparatus according to claim 12, wherein said switch is a neutral detection hydraulic switch configured to detect connection/nonconnection of a clutch.

15. The switch opening/closing detection apparatus according to claim 13, wherein the switch is placed into a disconnected state when low pressure is applied to the neutral detection hydraulic switch.

16. The switch opening/closing detection apparatus according to claim 13, wherein the switch is placed into a connected state when high pressure is applied to the neutral detection hydraulic switch.

17. The switch opening/closing detection apparatus according to claim 11, wherein the first wiring line is operatively connected to a first resistance type voltage dividing circuit formed from a pull-up resistor and a pull-down resistor for dividing the power supply and an A/D converter for measuring a voltage from an input port with the voltage being converted by the A/D converter and supplied to a central processing unit.

18. The switch opening/closing detection apparatus according to claim 11, wherein the second wiring line is operatively connected to a second resistance type voltage dividing circuit formed from a pull-up resistor and a pull-down resistor for dividing the power supply and an A/D converter for measuring a voltage from an input port with the voltage being converted by the A/D converter and supplied to a central processing unit.

19. The switch opening/closing detection apparatus according to claim 11, wherein an opening and closing of a neutral detection hydraulic switch occurs even if the first or the second wiring lines is broken.

20. The switch opening/closing detection apparatus according to claim 11, wherein different voltages are applied through resistance type voltage dividing circuits which alleviates the need for a voltage generating source for generating different voltages.

* * * * *